United States Patent [19]

Sakaki et al.

[11] Patent Number: 5,457,487
[45] Date of Patent: Oct. 10, 1995

[54] COLOR IMAGE FORMING APPARATUS WHICH TIMES RELEASE OF EACH OF PLURAL COLOR IMAGE SIGNALS

[75] Inventors: Eihiro Sakaki, Chofu; Hidekazu Tominaga, Kawasaki; Yasuo Ito, Yokosuka; Akira Torisawa, Machida; Masaki Ohtake; Tetsuya Kobayashi, both of Kawasaki; Fumihiro Ueno, Yokohama; Tomohiro Hashimoto; Eiichiro Teshima, both of Kawasaki, all of Japan

[73] Assignee: Canon Kabushiki Kaisha, Tokyo, Japan

[21] Appl. No.: 998,867

[22] Filed: Dec. 30, 1992

[30] Foreign Application Priority Data

Jan. 8, 1992 [JP] Japan .................................. 4-001568

[51] Int. Cl.⁶ .................................................. G01D 15/06
[52] U.S. Cl. .................................. 347/116; 347/248
[58] Field of Search .............................. 346/108, 157, 346/160; 358/296, 409, 410, 412; 347/116, 129, 248, 249, 250; 355/244, 316

[56] References Cited

U.S. PATENT DOCUMENTS

| | | | |
|---|---|---|---|
| 4,677,292 | 6/1987 | Shimada | 358/410 X |
| 4,723,145 | 2/1988 | Takada et al. | 355/3 TR |
| 4,796,095 | 1/1989 | Shimada | 358/410 X |
| 4,914,485 | 4/1990 | Emori | 355/313 |
| 4,956,651 | 9/1990 | Emori | 346/108 |
| 5,014,137 | 5/1991 | Shimada | 358/410 |
| 5,083,140 | 1/1992 | Peterson et al. | 346/108 X |
| 5,086,318 | 2/1992 | Takeda et al. | 355/271 |
| 5,175,564 | 12/1992 | Jamzadeh | 346/108 |
| 5,264,870 | 11/1993 | Egawa | 346/108 |
| 5,305,023 | 4/1994 | Fukushige et al. | 346/108 |

FOREIGN PATENT DOCUMENTS

| | | |
|---|---|---|
| 303474 | 2/1989 | European Pat. Off. . |
| 3828583 | 3/1989 | Germany . |
| 62-195687 | 8/1987 | Japan . |
| 63-065457 | 8/1988 | Japan . |
| 2-006984 | 1/1990 | Japan . |

Primary Examiner—Benjamin R. Fuller
Assistant Examiner—Randy W. Gibson
Attorney, Agent, or Firm—Fitzpatrick, Cella, Harper & Scinto

[57] ABSTRACT

A color image forming apparatus forms a color image by superposing images of plural colors in plane-sequential manner. In the color image forming apparatus, the amount of aberration between the detection signal for the recording medium for the first color and the horizontal synchronization signal is measured by a counter, and the start timing of image formation of the second and subsequent colors is controlled by a delay device, according to the measured amount of aberration.

18 Claims, 10 Drawing Sheets

COLOR IMAGE FORMING APPARATUS WHICH TIMES RELEASE OF EACH OF PLURAL COLOR IMAGE SIGNALS

BACKGROUND OF THE INVENTION

1. Field of the Invention

The present invention relates to a color image forming apparatus in which images for respective color components are superposed in succession on a recording medium.

2. Related Background Art

Recently color printers have come into commercial use and are being utilized to create various color presentations. Particularly color page printers are attracting attention because of their quietness, high quality printing, and high speed in printing.

Among such color page printers, light (or lower) beam printers form color images by effecting a first step of scanning a photosensitive member with a light beam in a main scanning direction, effecting a first development to the image on the photosensitive member transferring the developed image from the photosensitive member onto a recording medium such as a recording sheet, and effecting second, third and fourth steps in succession in similar manner but with different colors, thereby recording a full color image.

In in more detail such a following there will be described the recording method for a color image, with reference to FIGS. 8 and 9.

Figure 8:
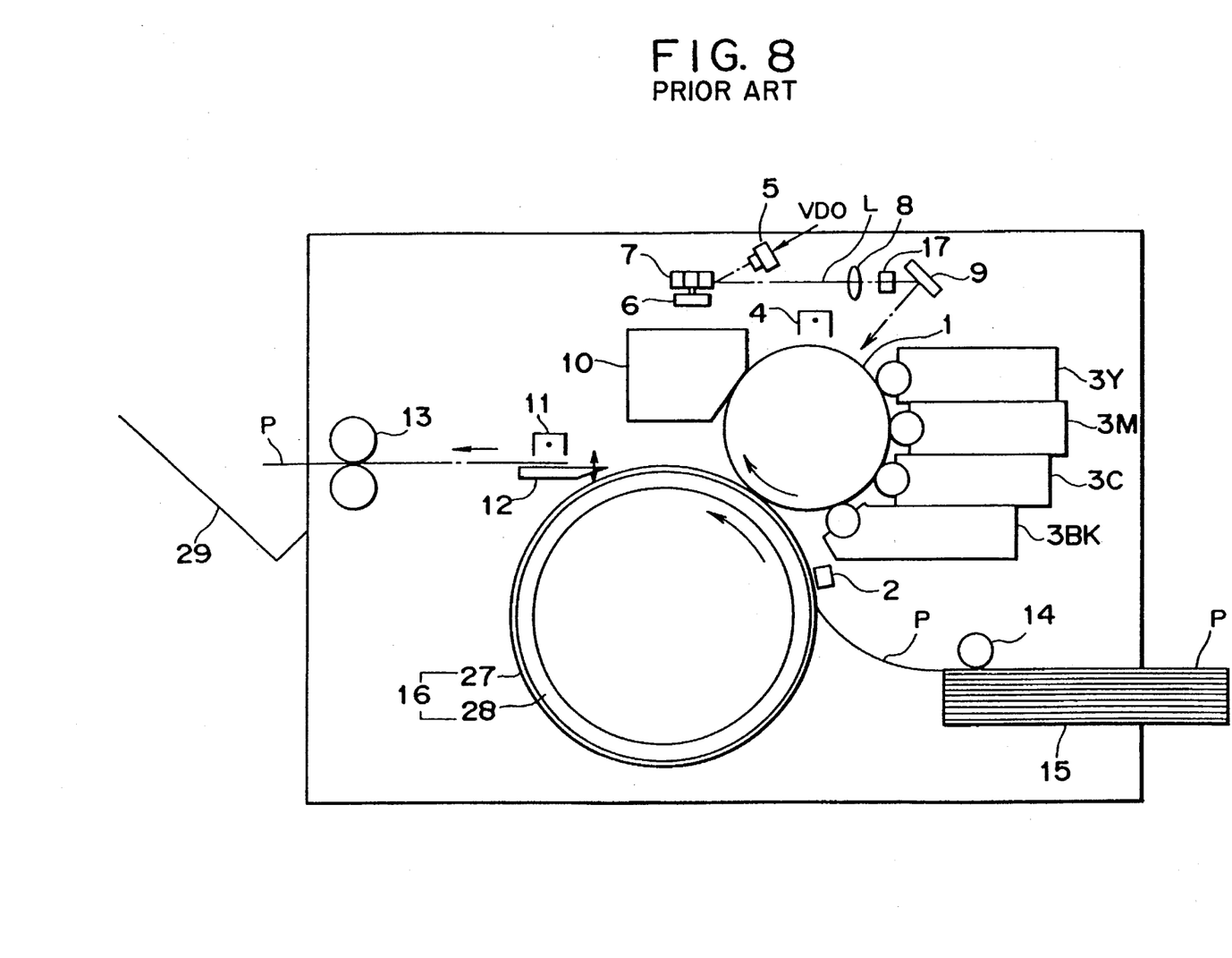
FIG. 8 is a view showing the configuration of a conventional light beam color printer.
Figure 9:
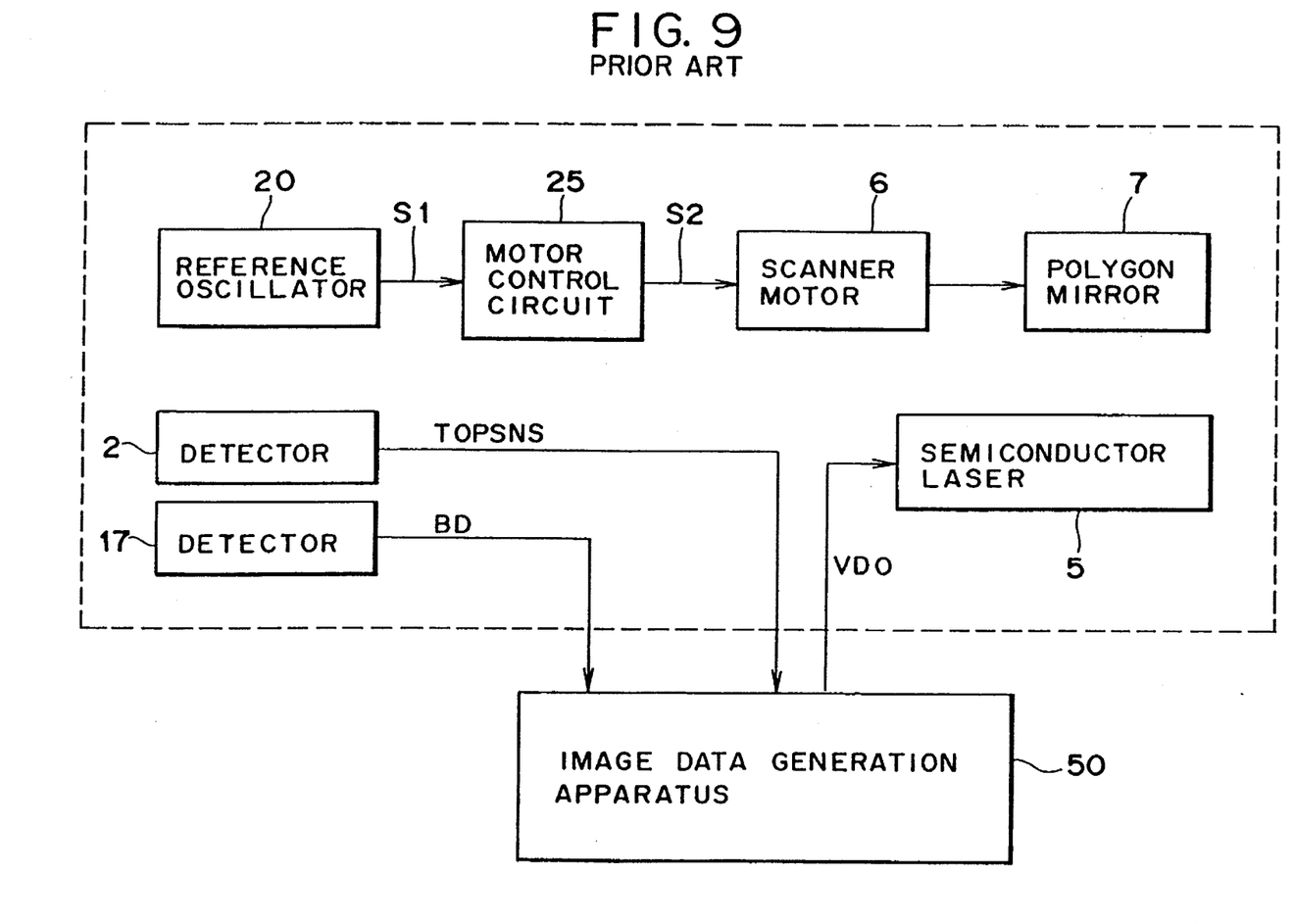
FIG. 9 is a block diagram of a conventional configuration.

At first a photosensitive drum 1, rotated at a predetermined speed in a direction indicated by an arrow in FIG. 8, is charged to a predetermined voltage of a predetermined polarity by a charger 4. Then, recording sheets P are fed one by one by a feeding roller 14 from a sheet cassette 15. When the leading end of the sheet is detected by a detector 2, a laser beam L modulated by an image signal VDO is emitted from a semiconductor laser 5 toward a polygon mirror 7 for diversion into scanning motion, and is guided through a lens 8 and a mirror 9 onto the photosensitive drum 1. A signal (referred to as TOPSNS hereinafter) from a detector 2 positioned at an end of the light scanning path is supplied, as a vertical synchronization signal, to an image data generation apparatus 50 (FIG. 8). The image signal VDO is supplied in succession to the laser 5, utilizing a BD signal to be described later, as a horizontal synchronization signal, succeeding to the TOPSNS signal.

A beam detect signal (referred to as the BD signal), constituting the horizontal synchronization signal, is obtained by detecting the laser beam L with a detector 17. The polygon mirror 7 is rotated by a scanner motor 6, which is so controlled, according to a signal S2 from a motor control circuit 25 provided with a frequency divider for dividing the frequency of a signal S1 from a reference oscillator 20, as to rotate with a predetermined constant speed.

Thus, the photosensitive drum 1 is scan-exposed in synchronization with the BD signal, and a first electrostatic latent image is developed with a developing unit 3Y to form a first toner image of yellow color on the photosensitive drum 1.

On the other hand, immediately before the leading end of the recording sheet P, fed at the predetermined timing, reaches a transfer start position, a predetermined transfer bias voltage of a polarity opposite to that of the toner is applied to a main body 28 of a transfer drum 16, whereby the recording sheet P is electrostatically attracted onto a surface 27 of the transfer drum 16, simultaneously with the transfer of the first toner image onto the recording sheet P.

Then, the photosensitive drum 1 is scanned with the laser beam L to form a second electrostatic latent image, which is developed with a developing unit 3M to form a second toner image of magenta color on the photosensitive drum 1. The second toner image is transferred onto the recording sheet P, in alignment with the first toner image already transferred onto the recording sheet P. The leading end of the image of each color is defined by the TOPSNS signal.

Similarly, a third electrostatic latent image is formed and developed with a developing unit 3C to form a toner image of cyan color, which is transferred, in registration, onto the recording sheet P. Subsequently, a fourth electrostatic latent image is formed and developed with a developing unit 3BK to form a black toner image which is transferred, in registration, onto the recording sheet P.

In this manner, the VDO signal of a page is supplied in succession to the semiconductor laser 5 for each step. Also, the untransferred toner is scraped by a cleaner 10 after each transfer step.

Subsequently, when the leading end of the recording sheet P, carrying toner images of four colors thereon, approaches the position of a separating finger 12, the finger 12 moves closer and touches the surface 27 of the transfer drum 16, thereby separating the recording sheet P therefrom. The front end of the separating finger 12 continues to be in contact with the transfer drum 16 until the rear end of the recording sheet P is separated from the transfer drum 16, and returns to the original position thereafter. A charger 11 eliminates the charge accumulated on the recording sheet P, thereby facilitating the separation thereof by the separating finger 12 and reducing the discharge in the air at the separation. The separated recording sheet P is discharged, by fixing rollers 13, onto a discharge tray 29.

Figure 10:
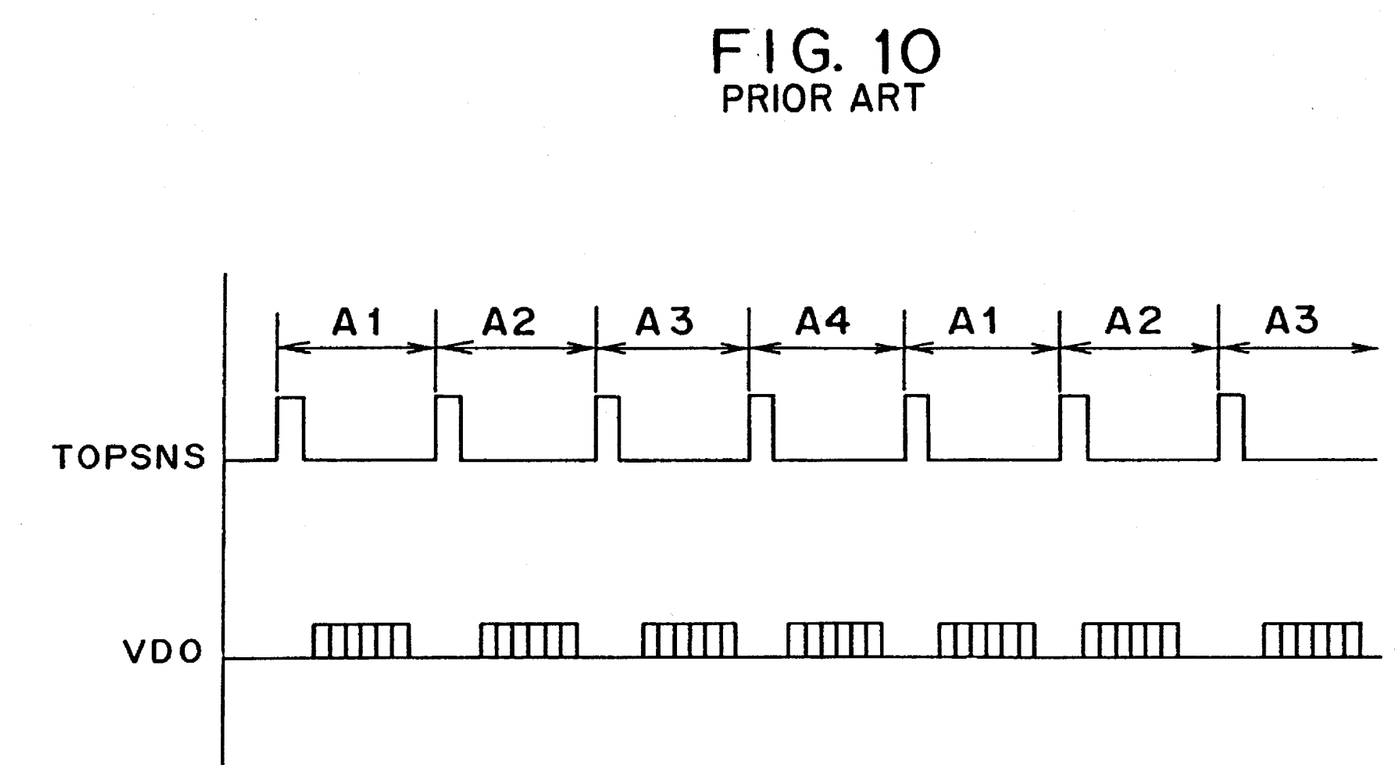
FIG. 10 is a timing chart showing the relation of the horizontal synchronization signal BD, vertical synchronization signal TOPSNS and image signal VDO in the conventional configuration.

FIG. 10 is a timing chart showing the relation between the above-mentioned TOPSNS signal and the VDO signal, wherein A1 to A4 respectively indicate the printing operations of the first to fourth colors, and sections A1 to A4 constitute the color printing operations of a page.

Figure 11:
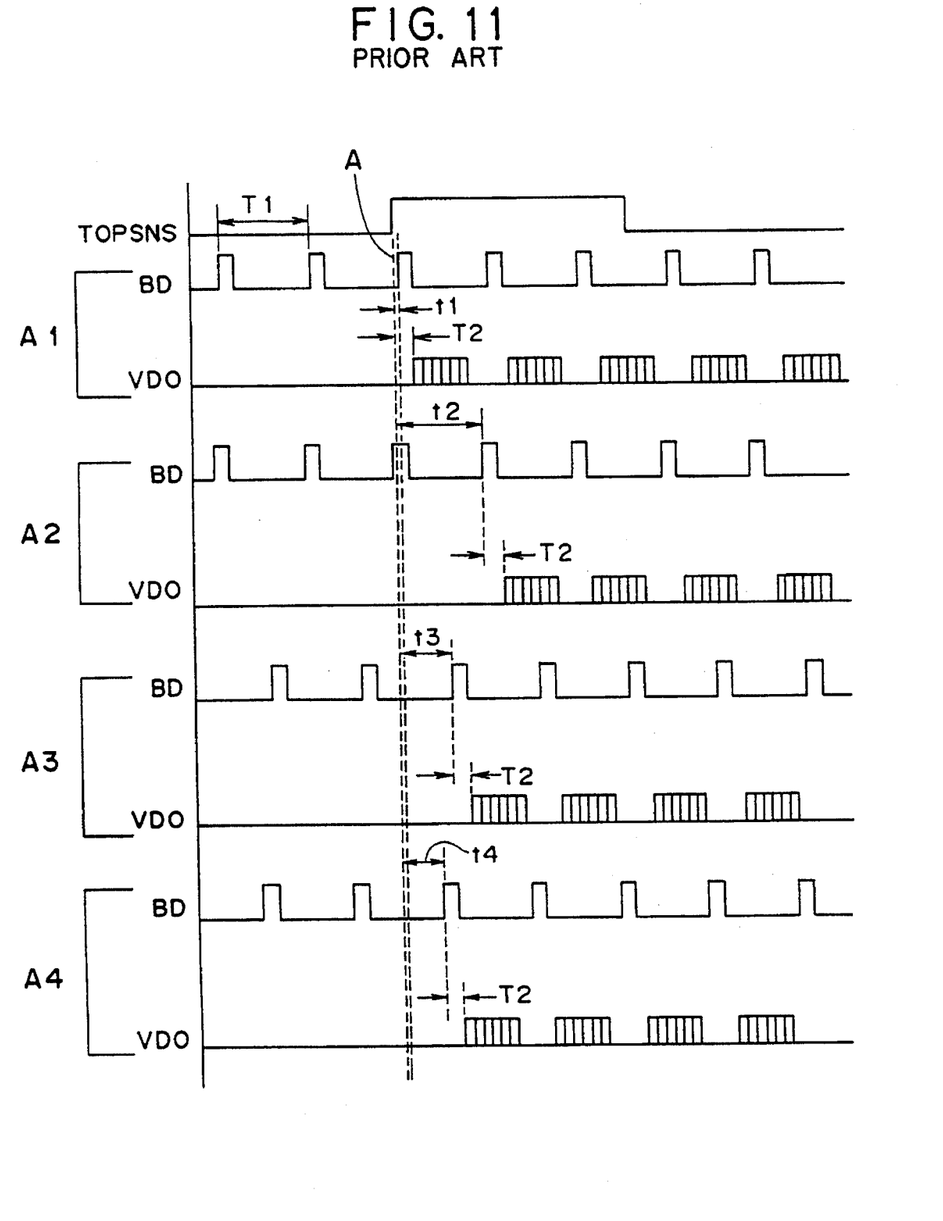
FIG. 11 is a timing chart showing the relation of the color aberration, horizontal synchronization signal BD, vertical synchronization signal TOPSNS and image signal VDO in the conventional configuration.

FIG. 11 is a timing chart indicating the timing of the BD signal and the VDO signal for respective colors with respect to the TOPSNS signal.

It is noted, in the above-mentioned conventional example, that there is generated an aberration of almost one l between the BD signals of the first and second colors, as indicated by (t2−t1), though the BD signals thereof are mutually aberrated only by a little. The aberration in colors is generated within a cycle time T1 of the BD signal from the leading end A of the TOPSNS signal. The aberration between the first and third colors, and that between the first and fourth colors respectively correspond to (t3−t1) and (t4−t1). Also, the VDO signal from A1 is aberrated by T2 from the TOPSNS signal, and the VDO signals from A2 to A4 are aberrated from the TOPSNS signal by (t2+T2), (t3+T2) and (t4+T2), respectively.

Figure 5:
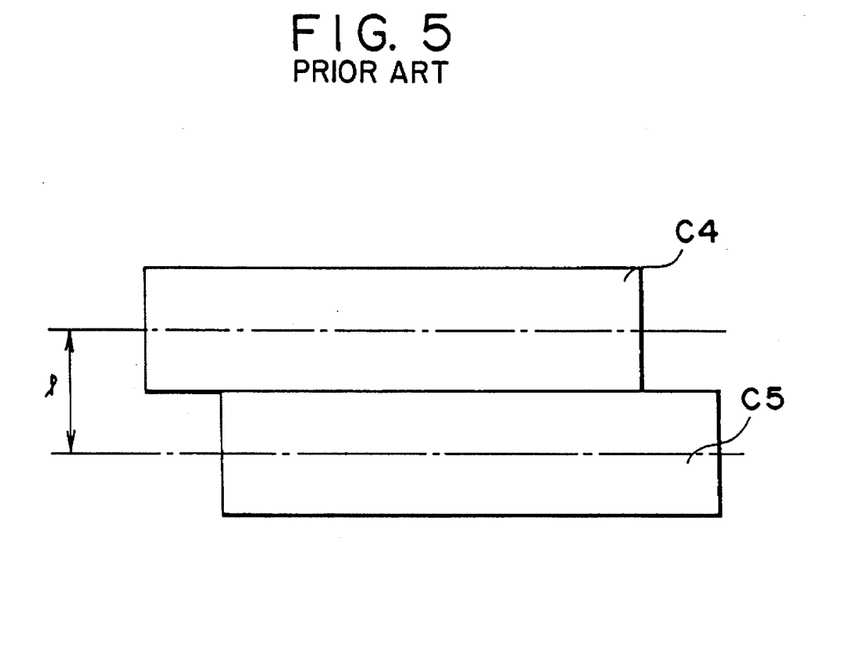
FIG. 5 is a schematic view showing aberration in colors in the conventional example.

The color image finally fixed on the recording sheet has to have precise registration of different colors, but is deteriorated in quality in case that a color is significantly aberrated as described above. In FIG. 5, C4 indicates the first line of a color showing aberration, while C5 indicates the first line of another color, and l indicates the pitch of lines.

In the color recording, the precision of alignment of respective colors is generally important, as described in "Imaging Part 2", pages 38 to 39 (published by Shashin Kogyo Shuppan Co.).

In the human visual system, the contrast sensitivity is highest in a spatial frequency region of 50–100 dpi, and the sensitivity becomes lower as the spatial frequency increases. However, the contrast sensitivity is still practically high even in a range of 400–800 dpi. In correlation of the precision of registration and the image quality, which is rated as 100 points for the perfect quality, a quality of 95 points requires a precision of about 90 μm while a quality of 100 points requires a precision of 75 μm or less. Thus, in an equipment of 300 dpi, since one dot corresponds to 85 μm, an aberration of one dot deteriorates the quality rating. Also, in an equipment of higher resolution, the aberration of one dot is detectable as described above, so that the print quality is deteriorated.

The tolerance in registration is far narrower in the characters and line images (which are binary, or black-and-white images than in multi-level images, and the aberration in the registration results not only in the deterioration of resolution but also in the aberration in the hue of fine lines, thus giving rise to deteriorated print quality.

Aberration in color can be prevented by improving the individual accuracy of the rotation control of the driving systems for the scanning optical system and the photosensitive and transfer drums. However it is almost impossible to improve the accuracy of the rotation control so as to eliminate aberration smaller than one l as described above.

SUMMARY OF THE INVENTION

The object of the present invention is to resolve the above-mentioned drawbacks in the prior art and to provide a color image forming apparatus capable of minimizing the color aberration.

The above-mentioned object can be attained, according to the present invention by a color image forming apparatus provided with light scanning means for deflecting a light beam, modulated according to image signals, by a rotary polygon mirror and guiding the light beam to an image carrying member to thereby scan the image carrying member, light detection means for detecting a light scanning start position of the light scanning means, a group of developing means for developing latent images, formed on the image carrying member by the scanning of the light scanning means, with plural developing materials, and transfer means for transferring visible images, obtained by the development with the group of developing means, onto a same transfer material after the respective developments, the color image forming apparatus comprising front end detection means for detecting the front end of the transfer material prior to the transfer by the transfer means, measuring means for measuring the aberration in synchronization between the detection of the front end of the transfer material by the front end detection means and the horizontal synchronization of the light scanning by the light detection means, and signal output means for generating a signal defining the front end of the image and the horizontal synchronization signal, after a predetermined time from the detection of the front end by the front end detection means, in response to the aberration in synchronization, measured by the measuring means.

According to the present invention, the front end of the transfer material is detected by the front end detection means, prior to the transfer by the transfer means, then the aberration between the detection of the front end of the transfer material by the front end detection means and the horizontal synchronization of light scanning detected by the light detection means is measured by the measuring means, and the signal defining the front end of the image and the horizontal synchronization signal are generated after a predetermined time from the detection of the front end by the front end detection means, according to the aberration in synchronization measured by the measuring means.

Other objects of the present invention, and the advantages and features thereof, will become fully apparent from the following detailed description to be taken in conjunction with the attached drawings, and also from the appended claims.

DETAILED DESCRIPTION OF THE PREFERRED EMBODIMENTS

Now, the present invention will be clarified in detail by preferred embodiments thereof shown in the attached drawings.

Figure 1:
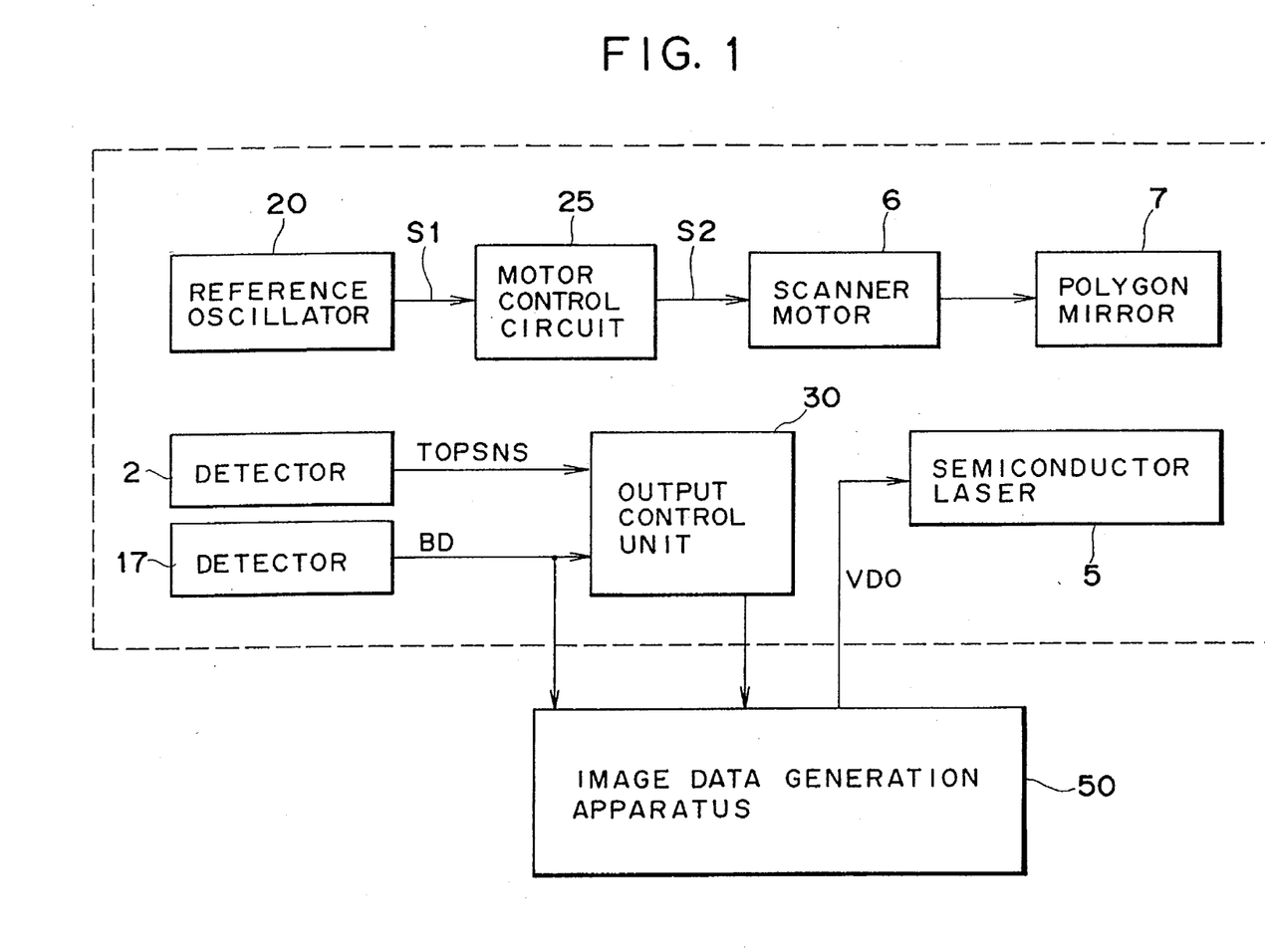
FIG. 1 is a block diagram of a first embodiment of the present invention.

FIG. 1 shows a first embodiment of the present invention applied to a color light beam printer.

The mechanical configuration of the present embodiment is similar to that of FIG. 8, and the same components as those in FIG. 8 are represented by the same reference numerals or symbols. After receiving the TOPSNS signal from a detector 2 and after a predetermined time from the reception of the BD signal from a detector 17, an output control unit 30 sends to an image data generation apparatus 50 a VSYNC signal, defining the front end of the image. The image data generation apparatus 50 sends the VDO signal to a semiconductor laser 5, based on a BD signal succeeding to the VSYNC signal from the output control unit 30.

Figure 2:
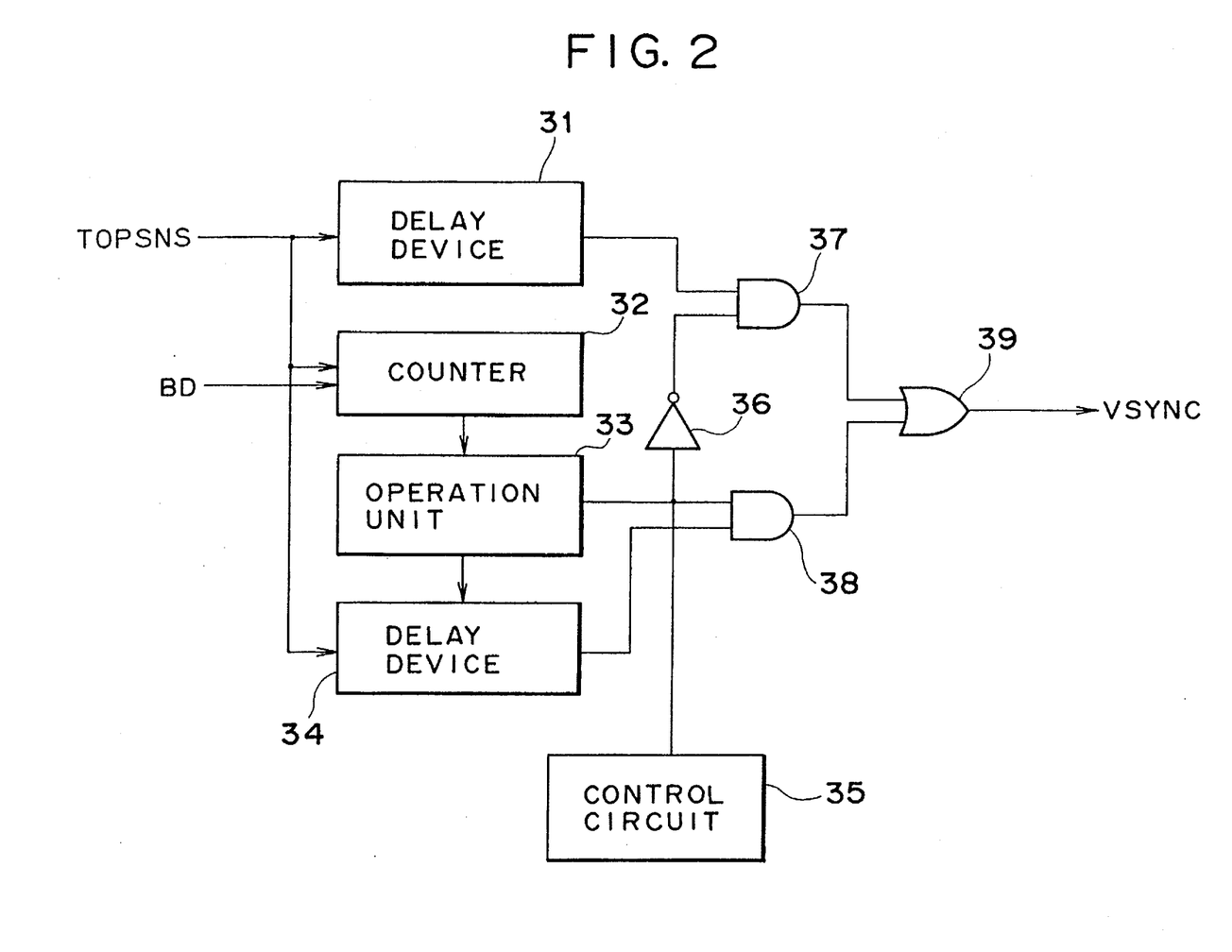
FIG. 2 is a block diagram of a control unit in the first embodiment.

FIG. 2 shows the configuration of the output control unit 30. A delay device 31 delays the entered TOPSNS signal by a theoretical cycle time T1 of the BD signal, and then supplies the delayed TOPSNJ signal to an AND gate 37. A counter 32, constituting the measuring means of the present invention, counts the aberration from the entered TOPSNS signal to the first BD signal, for supply to an operation unit 33. The operation unit 33 calculates, from the entered aberration time (T1+t1), a value (T1/2+t1) for supply to a delay device 34. The calculation of the operation unit 33 is conducted only when a control circuit 35 identifies the printing operation for the first color. In the succeeding printing operations, the calculation is not conducted and the calculated value for the first color is retained. The delay device 34 delays the TOPSNS signal supplied to an AND gate 38, by the output value of the operation unit 33. The control circuit 35 discriminates whether the printing operation of the printer is for the first color or not, and respectively sends to an inverter 36 a LOW level signal in case of the first color or a HIGH level signal in case of the second or subsequent colors. The AND gate 37 sends the output of the delay device 31 to an OR gate 39 or intercepts the output, depending on the signal from the inverter 36. Also, the AND gate 38 sends the output of the delay device 34 to the OR gate 39 or intercepts the output, depending on the signal from the control circuit 35. The OR gate 39 releases the entered signal as the VSYNC signal. Thus, the inverter 36, AND gates 37, 38 and OR gate 39 select either the output of the delay device 31 or 34, depending on the output signal of the control circuit 35. The output of the delay device 31 or 34 is released as the VSYNC signal from the OR gate 39, respectively if the output of the control circuit 35 is LOW or HIGH.

Figure 3:
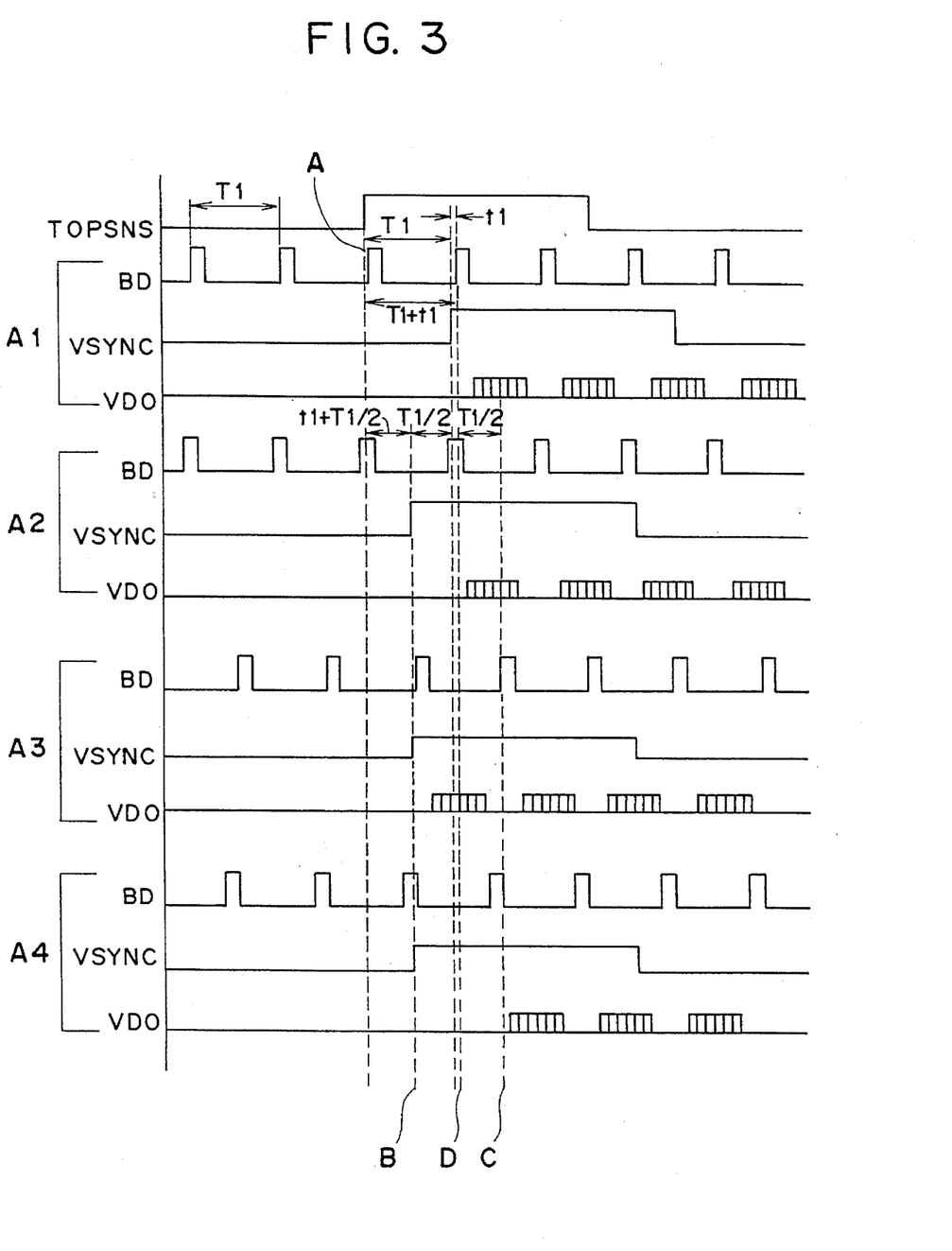
FIG. 3 is a timing chart showing the functions of the control unit of the first embodiment.

FIG. 3 is a timing chart for explaining the function of the control unit 30 described above. The timing chart shows an example of the BD and VDO signals for respective colors with respect to the TOPSNS signals, when the TOPSNS signals for different colors are made to mutually coincide. In FIG. 3, A1, A2, A3 and A4 indicate the printing periods for respective colors as already described in the conventional example. In the following the functions of the control unit 30 will be described with reference to FIGS. 2 and 3.

In the period A1, the control circuit 35 identifies that the printer initiates the printing operation for the first color and sends the LOW level signal to the inverter 36 and the AND gate 38, whereby the OR gate 39 is prepared to send the output signal of the delay device 31 as the VSYNC signal to the image data generation apparatus 50. The delay device 31 releases the entered TOPSNS signal to the AND gate 37, with a delay corresponding to the cycle time of the BD signal, and the released signal is supplied, as the VSYNC signal, from the OR gate 39 to the image data generation apparatus 50. In response to the VSYNC signal, the image data generation apparatus 50 supplies the laser 5 with the VDO signal by a line at a time, in synchronization with the succeeding BD signals, starting after a predetermined timing (cycle time) T1.

On the other hand, in response to the entered TOPSNS signal, the counter 32 counts the aberration to the first succeeding BD signal, and sends the count to the operation unit 33. The operation unit 33 calculates, from the entered count (T1+t1)–T1/2, a value (T1/2+t1) for supply to the delay device 34. This operation is executed before the start of the printing operation for the second color. The calculation is not conducted in the subsequent printing operations, during which the calculated value for the first color is retained.

In the subsequent printing operation period A2 for the second color, the control circuit 35 identifies that the printer is not in the printing operation for the first color, and sends the HIGH level signal to the inverter 36 and the AND gate 38, whereby the OR gate 39 is prepared to release the output signal of the delay device 34, as the VSYNC signal, to the image data generation apparatus 50. The delay device 34 sends the entered TOPSNS signal to the AND gate 38, with a delay by a time (T1/2+t1) retained in the operation unit 33. The signal is supplied, as the VSYNC signal, from the OR gate 39 to the image data generation apparatus 50, which, in response, releases the VDO signal to the laser 5 by a line at a time, in synchronization with the succeeding BD signal starting after a predetermined time (T1/2+t1).

Figure 4:
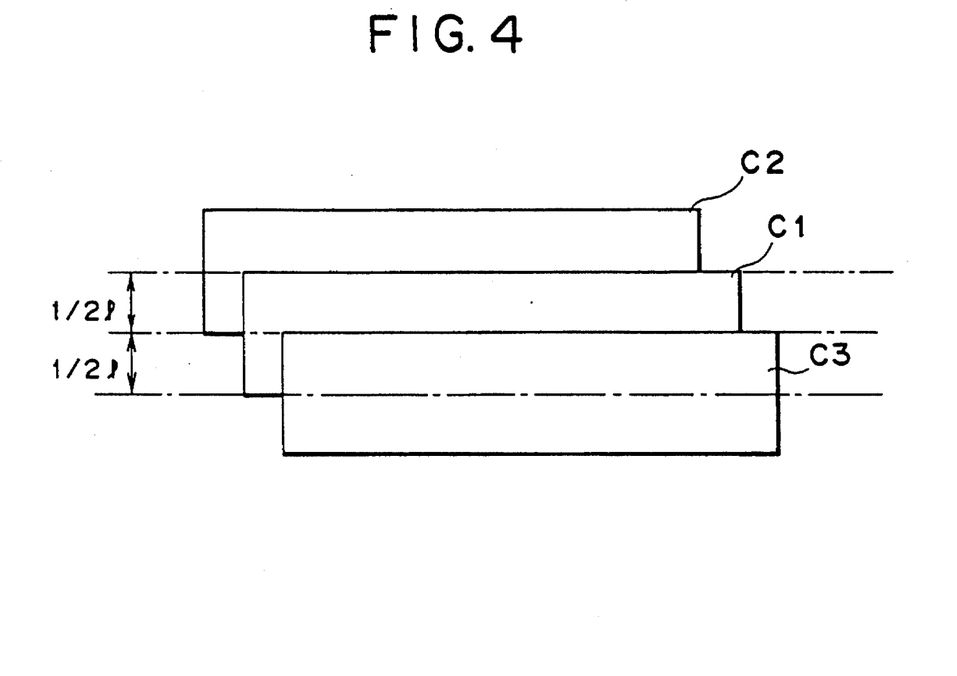
FIG. 4 is a schematic view showing aberration in colors in the present invention.

The subsequent operations will not be described as they are similar to the operation for the second color. Through the above-mentioned operations, the printing of the second or subsequent color is started within ±1/2, namely between B and C in FIG. 3, with respect to the print start position D for the first color. FIG. 4 illustrates that lines C2, C3 for the second and subsequent colors are printed within ±1/2, with respect to the line C1 for the first color. Thus, the aberration in each color is maintained within 1/2.

In the foregoing description, it is assumed that T1+t1 is larger than T1, but, the color aberration is naturally retained within 1/2 even in case that T1+t1 is smaller than T1, namely in case that t1 is negative.

[Second Embodiment]

In the following there will be explained a second embodiment of the present invention, with reference to the attached drawings.

Figure 6:
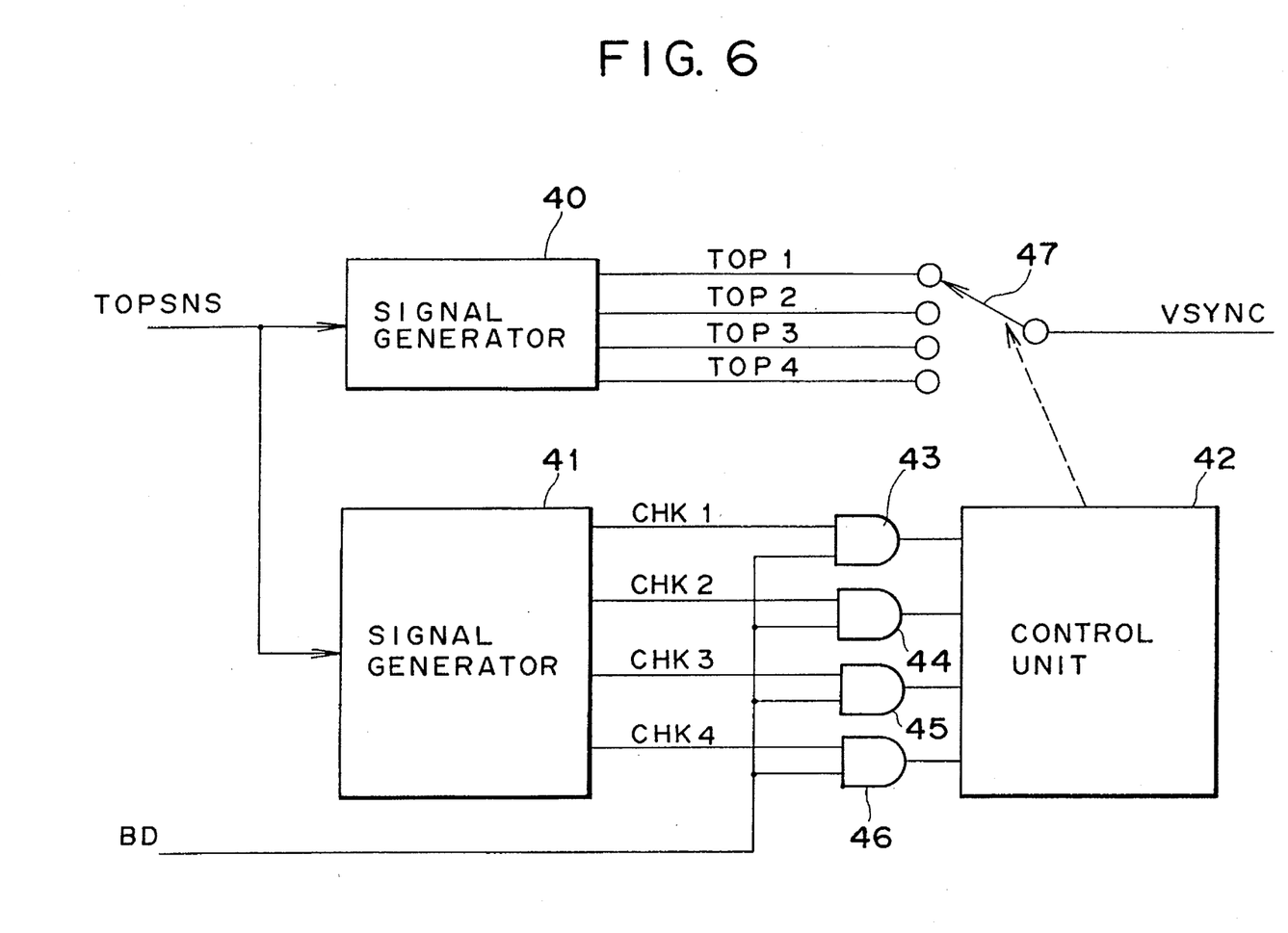
FIG. 6 is a block diagram of the control unit in a second embodiment.
Figure 7:
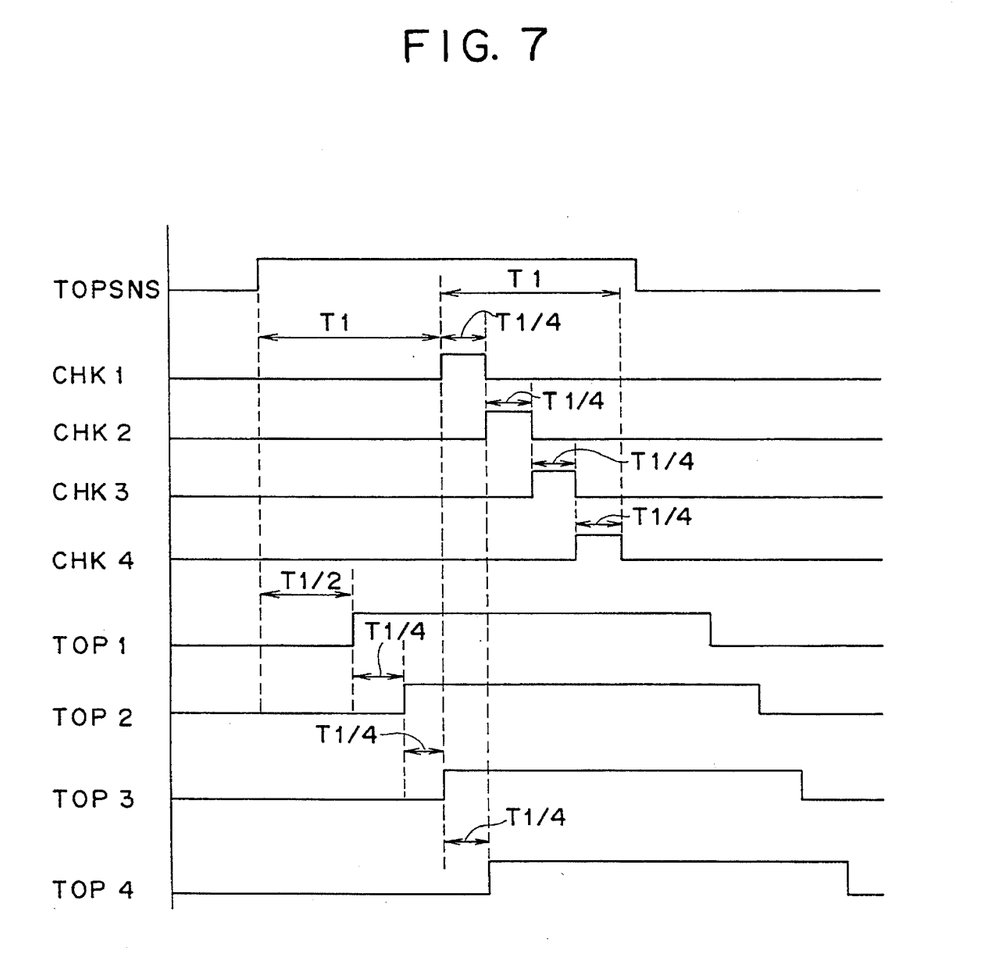
FIG. 7 is a timing chart showing the functions of the control unit of the second embodiment.

FIG. 6 is a block diagram showing the configuration of a control unit 30 in the second embodiment, and FIG. 7 is a timing chart showing the functions thereof.

In FIG. 6, a signal generator 40 generates, based on the entered TOPSNS signal, delayed signals TOP1, TOP2, TOP3 and TOP4 respectively delayed from the leading edge of the TOPSNS signal by T1/2, T1×3/4, T1 and T1×5/4 as shown in FIG. 7, for supply to switch means 47, which selects one of the delayed signal for supply to the image data generating apparatus 50.

A signal generator 41 generates, as shown in FIG. 7, signals CHK1, CHK2, CHK3 and CHK4 of a pulse duration of T1/4 respectively delayed from the leading edge of the TOPSNS signal by T1, T1×5/4, T1×6/4 and T1×7/4 for supply respectively to AND gates 43, 44, 45 and 46. The AND gates 43–46 produce logic products of the signals CHK1–CHK4 with the entered BD signal, for supply to the control unit 42.

The control unit 42, upon identifying the TOPSNS signal for the first color, discriminates the true output of the AND gates 43–46, and, for the VSYNC signal for the second or subsequent color, selects one of the signals TOP1–TOP4 as the VSYNC signal by the switch means 47 according to the following logic.

In the following there will be described the control of the control unit 42 in more detail.

Control unit 42 causes the switch means 47 to select the signal TOP1, TOP2, TOP3 or TOP4 respectively if the AND gate 43, 44, 45 or 46 is true.

Thus, the color aberration of the second or subsequent color is (T1/8±T1/2). Though the amount of aberration is somewhat larger than that of aberration in the first embodiment, the circuit configuration can be simplified as the counter is not used.

As described in the foregoing, the present invention can reduce the aberration in colors, thereby enabling color printing of extremely high quality.

The present invention is not limited to the foregoing embodiments, but is subjected to various modifications within the spirit and scope of the appended claims.

What is claimed is:

1. A color image forming apparatus comprising:
   light scanning means for scanning an image carrying member with a light beam modulated according to an image signal;
   light detection means for detecting, in a predetermined position, the light beam scanned by said light scanning means;
   plural developing means for developing latent images, formed on said image carrying member by the scanning with said light scanning means, with recording materials for respective color components;
   transfer means for transferring the developed images, obtained with said developing means, in succession onto a single transfer material;
   position detection means for detecting said transfer material at a predetermined position, prior to transfer by said transfer means;
   measuring means for measuring an aberration between a position detection signal for the transfer material by said position detection means for a particular color and a beam detection signal by said light detection means; and
   control means for controlling release of an image signal for a color other than the predetermined color, from detection of the transfer material by said position detecting means according to the aberration measured by said measuring means.

2. An apparatus according to claim 1, wherein said apparatus forms an image by an electrophotographic process.

3. An apparatus according to claim 1, wherein said control means generates, for a predetermined color, a vertical synchronization signal with a constant timing with respect to the position detection signal from said position detection means, and, for other colors, the vertical synchronization signal with a timing corresponding to the measured value of said measuring means, with respect to the position detection signal from said position detection means.

4. An apparatus according to claim 1, wherein said measuring means includes a timer.

5. An apparatus according to claim 1, wherein said measuring means includes means for dividing predetermined time into plural divided times; and means for discriminating one of plural divided times, divided by said dividing means, in which a vertical synchronization signal is released.

6. An apparatus according to claim 3, wherein said control means includes delay means for delaying the position detection signal from said position detection means with a delay amount corresponding to the measured value by said measuring means, said delay means releasing said delayed signal as the vertical synchronization signal.

7. An apparatus according to claim 3, wherein said control means includes means for generating plural vertical synchronization signals of mutually different timings with respect to the position detection signal from said position detection means, and selection means for selectively releasing one of said plural vertical synchronization signals, according to the measured value by said measuring means.

8. An image processing apparatus for controlling release of each of plural image signals of respective plural colors which are superposed in plane-sequential manner on a recording medium so as to form a full color image, comprising:
   measuring means for measuring, at release of an image signal of a first color, an output timing of a horizontal synchronization signal with respect to a position signal of said recording medium; and
   control means for controlling timing of release of image signals of second and subsequent colors, according to the measured output timing of said measuring means.

9. An apparatus according to claim 8, wherein said control means generates a vertical synchronization signal with different timings according to the measured value of said measuring means, in relation to the release of the image signals of the second and subsequent colors, thereby controlling the timing of release of the image signals of the second and subsequent colors with respect to said position signal.

10. An apparatus according to claim 8, wherein said measuring means includes a timer.

11. An apparatus according to claim 8, wherein said measuring means includes means for dividing predetermined time into plural divided times; and means for discriminating one of plural divided times, divided by said dividing means, in which a vertical synchronization signal is released.

12. An apparatus according to claim 9, wherein said control means delays said position signal with a delay amount according to the measured value of said measuring means and releases the delayed signal as the vertical synchronization signal.

13. An apparatus according to claim 9, wherein said control means includes means for generating plural vertical synchronization signals with mutually different timings with respect to said position signal; and selection means for selectively releasing one of said plural vertical synchronization signals, according to the measured value of said measuring means.

14. An apparatus according to claim 8, further comprising image forming means for forming a color image by superposing images in plane-sequential manner, in accordance with image signals of respective color components.

15. An apparatus according to claim 14, wherein said image forming means releases the horizontal synchronization signal.

16. An apparatus according to claim 14, wherein said image forming means forms a color image by an electrostatic recording method.

17. An apparatus according to claim 14, wherein said image forming means forms a color image by an electrophotographic process utilizing a laser beam.

18. An apparatus according to claim 17, wherein said image forming means includes deflection means for scanning a photosensitive member with a laser beam, and means for detecting said laser beam at a predetermined position and releasing the detection signal as the horizontal synchronization signal.

* * * * *

UNITED STATES PATENT AND TRADEMARK OFFICE
CERTIFICATE OF CORRECTION

PATENT NO. : 5,457,487
DATED : October 10, 1995
INVENTOR(S) : Eihiro Sakaki, et al It is certified that error appears in the above-indentified patent and that said Letters Patent is hereby corrected as shown below:

Column 1, line 19, change "(or lower) to --(or, laser)--;

line 22, change "to" to --of--; and
line 23, change "member" to --member,--.

Column 3, line 17, change "images" (first occurrence) to --images) --.

Signed and Sealed this

Thirteenth Day of February, 1996

*Attest:*

BRUCE LEHMAN

*Attesting Officer*     Commissioner of Patents and Trademarks